July 27, 1965  K. C. ALLEN  3,196,964
AUTOMATIC CONVEYOR AND WEIGHING SYSTEM
Filed June 4, 1963
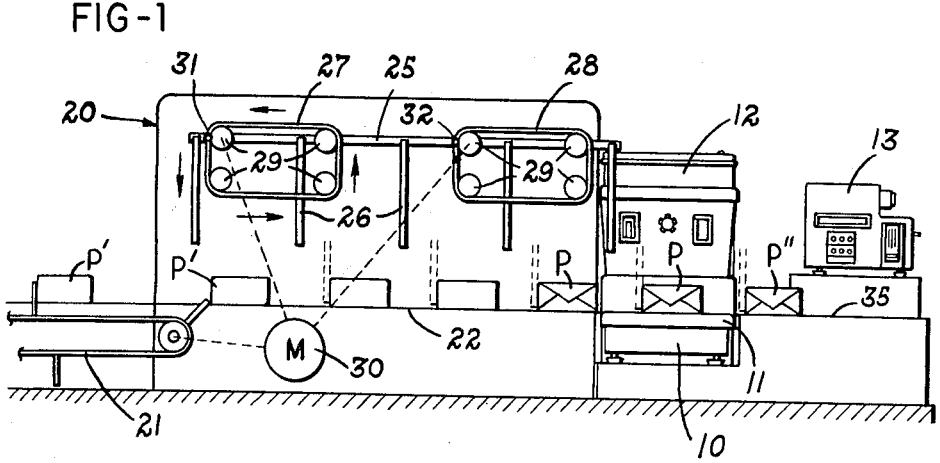
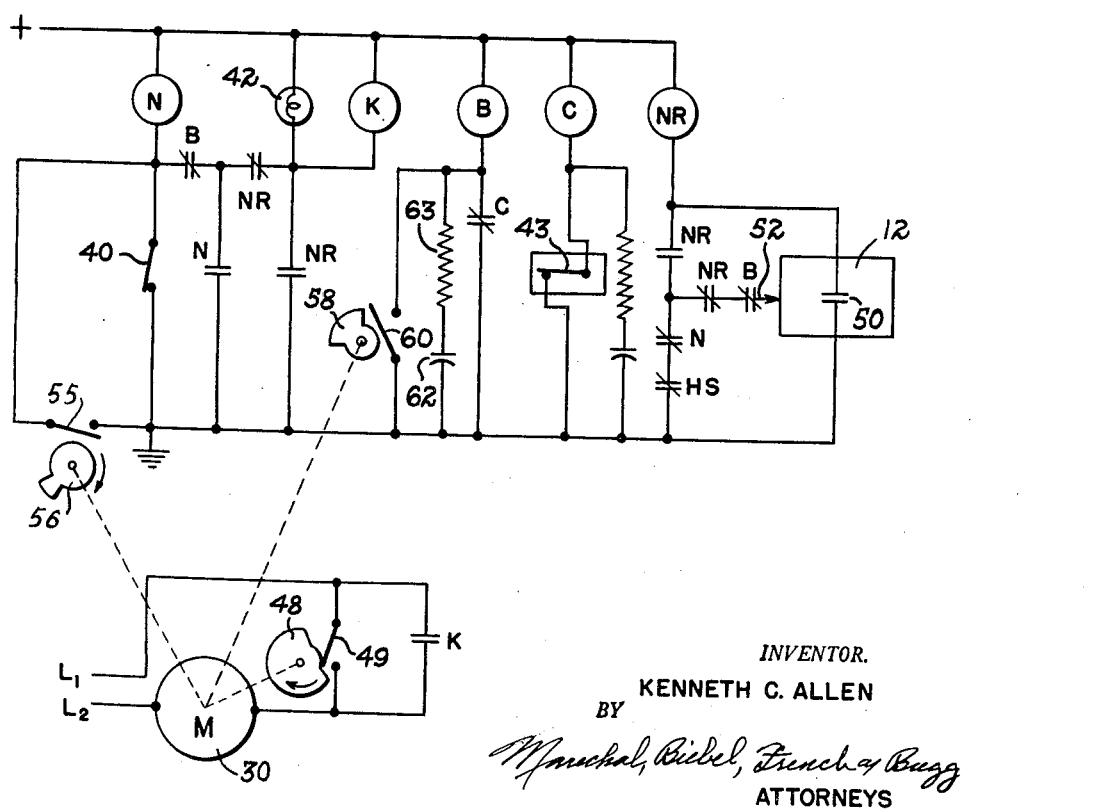
INVENTOR.
KENNETH C. ALLEN
BY
Marchal, Biebel, French & Bugg
ATTORNEYS United States Patent Office 3,196,964
Patented July 27, 1965

3,196,964
AUTOMATIC CONVEYOR AND WEIGHING SYSTEM
Kenneth C. Allen, Dayton, Ohio, assignor to The Hobart Manufacturing Company, Troy, Ohio, a corporation of Ohio
Filed June 4, 1963, Ser. No. 285,502
2 Claims. (Cl. 177—3)

This invention relates to an automatic conveyor and weighing scale system and more particularly to such a system which eliminates the possibility of an erroneous weight indication due to contact of the conveyor with an article to be weighed.

In combined automatic conveyor and weighing scale systems, it is possible under some conditions for the weighing system to provide either erroneously high or low readings where the scale comes to balance and automatic read out and/or computing begins before the conveyor moving element has physically separated from the package. The likelihood of the occurrence of such an erroneous reading is relatively slight where the automatic weighing and/or computing system has an inherent relatively long time delay for the purpose of ascertaining that a true balance has been established. However, modern automatic weighing and computing scale systems now operate with considerably less time delay in order to achieve higher speeds, and thus may initiate a cycle during time when the conveyor is in contact with the package and exerting a steady but extraneous force with a vertical component on the package.

It is therefore an important object of this invention to provide a control for preventing the automatic operation of the weighing scale system when the conveyor is in contact with an article to be weighed on the scale.

A further object of this invention is to provide apparatus which operates in predetermined timed relation with the conveyor cycle thus assuring that the package moving components of the conveyor have separated from the package on the scale platform before applying a start signal to the scale read-out mechanism.

A still further object of this invention is to provide a blocking circuit which prevents the automatic start of the computer while a conveyor member is in contact with a package on the scale and thereafter permits initiation of the computer operation, if the scale has come to balance.

These and other objects and advantages of the invention will be apparent from the following description, the accompanying drawings and the appended claims.

In the drawings—

FIG. 1 is a somewhat diagrammatic view in elevation showing a weighing system in accordance with the invention which is incorporated with a wrapping machine and includes a conveyor for delivering the successive wrapped packages to and from the scale platter; and FIG. 2 is a schematic wiring diagram in accordance with the invention for the wrapping and weighing system of FIG. 1.

The preferred embodiment of this invention is described as an improvement to the invention disclosed and claimed in applicant's Patent No. 3,085,640, issued April 16, 1963. Reference may be had to the above-identified patent for a full disclosure of the conveyor and control system, and only the portions of the conveyor, control and weighing scale system which are required for a full and complete understanding of the present invention are described herein. Referring to the drawing, which illustrates a preferred embodiment of the invention, the weighing system in FIG. 1 includes a scale indicated generally at 10 and having a platter 11 which receives the package or other article to be weighed.

The weighing mechanism of scale 10 cooperates with a computing apparatus, represented generally in FIG. 1 by the housing 12, to read out the total weight of each load in terms of pounds and suitable fractions of a pound, and the computer 12 also computes the value of a load in accordance with a preset price per pound. The scale 10 and computer 12 are interconnected with a register-printer indicated generally at 13. The register-printer 13 is constructed for cooperation with the scale and computer to print and issue successive printed tickets showing the weight and the unit price and value of each load weighed by the scale.

The remainder of the system shown in FIG. 1 includes a machine indicated generally at 20 for wrapping successive packages P to be delivered to the scale platter 11 for weighing and recording purposes, and since the details of the wrapping machine 20 are not related to the present invention, the showing of this machine in FIG. 1 is diagrammatic. It includes a feed table and conveyor 21 for delivering successive unwrapped packages P to a table or track 22 along which these packages move during the successive stages of the wrapping operation. This feeding movement of the packages is effected by a conveyor shown as comprising a bar 25 from which depend a plurality of pusher members 26. The bar 25 is in turn supported by a plurality of drive chains 27 and 28 each trained around four supporting sprockets 29 and driven by a common drive motor 30, which also drives the conveyor 21 in properly timed relation with the conveyor bar 25.

The conveyor bar 25 is provided with pivotal supports 31 and 32 on the chains 27 and 28 respectively so that as these chains move in counterclockwise direction as viewed in FIG. 1, the pusher members 26 move translationally along an essentially rectangular path providing four strokes, namely a forward feeding stroke to the right in FIG. 1, an upward stroke at the end of the feeding stroke, a return stroke, and a downward stroke. These movements and the proportions of the conveyor parts are coordinated with the positioning of the scale 10, with respect to the wrapping machine 20 in such manner that during each complete cycle of the conveyor, the package on the scale platter is weighed, its weight is recorded in the register-printer 13, and it is replaced by a new package. The weighed package P'' is shown in FIG. 1 as being delivered from the platter 11 to the top of a table 35 which supports the scale and the register-printer, and in the normal use of this system as shown, an operator will be stationed at this table to pick up the successive weighed packages and to effect application of the ticket thereto from the register-printer.

Referring to the control system shown in FIG. 2, the switch 40 is the no-load switch which is closed when there is no load on the scale platter 11. The closing of the switch 40 operates the no-load relay N which then becomes self-holding through one of its contacts and the normally closed or back contacts of the computer start relay B. The operation of the no-load relay N also illuminates a signal light 42 to notify the operator during manual use of the scale that the scale has completed its weighing operation on one load and is ready for the replacement of this load.

The circuit of FIG. 2 also includes a motion sensing switch 43 which may be constructed according to my United States Patent 2,873,416. The switch 43 provides means for sensing the balance position of the weighing scale with a load thereon, or alternatively, an unbalanced condition indicative of the presence of an unweighed load. When the platform 11 is in motion and the scale is therefore in an unbalanced condition, the switch 43 is open, control relay C is unenergized, and the balance relay B is accordingly operated through the back contacts of relay C. In the balance position of the scale, switch 43 closes and operates the control relay C.

The motor 30 drives a first cam means 48 to operate a switch 49 which is connected to the power supply of the motor to cause the motor circuit to be closed through a major portion of its cycle and to break the motor circuit during the portion of the cycle of the conveyor immediately prior to replacing the package on the scale with another package. The switch 49 and cam 48 comprise cycling control switch means for the conveyor drive means which is operable in synchronism with the conveyor for energizing the conveyor drive and operable to deenergize the conveyor drive prior to the end of its cycle.

The relay K is another control relay which has a coil connected in parallel with the signal light 42 and operates concurrently with the light 42 in the manner described above. The relay K has a contact which is arranged for the energization of the conveyor motor 30 in parallel with the switch 49 to continue the operation of the motor 30, signifying that the scale is ready to receive a new package. The contact of the relay K consists of second switch means which is connected in parallel with the cycling control switch 49 and operated by the weight sensing means to energize the conveyor independently of switch 49. As described in greater detail and claimed in the above-identified Allen Patent 3,085,640, this arrangement permits the conveyor to run continuously at its regular pace, but interrupts momentarily the operation of the conveyor in the event that the computing scale system is not ready for the next package or has not completed its weighing of the first package. The switch 55 and cam 56 correspond to the similarly numbered parts in Patent No. 3,085,640, and may be incorporated in the circuit in cooperation with motor 30 as described in that patent to interrupt operation of the conveyor if movement of the platform between packages has been insufficient to register the package.

The circuit of FIG. 2 further includes a non-repeat relay NR which is energized through a pair of contacts 50 in the computer. These contacts are temporarily closed to prevent recycling of the computer and the register-printer before another weighing operation, as described in the Allen Patent No. 3,045,229. The momentary closing of the contacts 50 completes an energizing circuit to the relay NR which then becomes self-holding through a pair of front contacts and the normally closed contacts of relay N and the normally closed contacts HS of the high speed balance motor relay. Contacts HS correspond to the contacts of the high speed motor relay 67 in applicant's Patent No. 2,921,780. Relay NR is released when relay N operates, such as by the removal of the load and the closing of switch 40, or by the opening of the contacts HS.

Initiating means for applying a computer start signal to the computer 12 for the purpose of initiating the read-out of the weighing mechanism in a cycle of operation, for computing value and subsequently the printing of a ticket of weight and value, includes a computer start lead 52. The grounding of the lead 52 through the normally closed or back contacts of the start relay B, the non-repeat relay NR, the no-load relay N and the contacts HS will cause the computer to start, as described above.

Means for preventing the weight read-out by preventing the operation of the initiating means during the time that conveyor member 26 is in contact with a package on the platter includes a cam 58 which is operated by the motor 30 in synchronism with the conveyor. The cam 58 closes a switch 60 leading from the relay B to ground during the time that the pusher members 26 are in contact with the packages and subsequently opens the switch 60. The opening of the switch 60 breaks a holding circuit to the computer start relay B. The relay B will then open with a short time delay as provided by a capacitor 62 and resistor 63, provided that the scale is in balance and relay C has operated. The release of relay B applies a ground to the computer through the line 52 comprising the computer start.

The switch 60 may therefore be considered as having a first operating position which prevents the release of the relay B and a second operating position which permits the release of relay B. The cam 58 may be considered as the means which moves in synchronism with the conveyor and effective to move the switch 60 from its second to its first position concurrently with the movement of the conveyor members 26 out of contact with an article on the scale platform. Thus during each feeding stage of the members 26, the cam 58 and switch 60 cooperate to block release of relay B and the initiation of a read out and recording cycle irrespective of the condition of the motion sensing switch 43, but during the nonfeeding stages of the members 26, when they are out of contact with the load on the platform 11, the initiation of a read out and recording cycle is under the control of the motion sensing switch 43.

It will therefore be seen that the invention provides means operated in synchronism with the conveyor for preventing the automatic operation or initiation of operation of the scale system while a conveyor pusher member 26 is in contact with a package on the scale platform. In this manner, the possibility of error introduced by a downward or possibly upward component of force by one of the members 26 on the package is eliminated, with the result that the high speed weighing and computing abilities of the scale may be utilized to the fullest extent practicable.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A conveyor and automatic weighing scale computer system for weighing a plurality of articles in succession on the platform of an automatic scale including a cyclically operable conveyor having article handling means arranged to move a succession of said articles onto the scale platform and means for recording the weight of each said article and printing a record thereof, the improvement comprising normally continuously running conveyor drive means for operating said conveyor, sensing means responsive to said scale in balance with a load thereon or, alternatively, to an unbalanced condition of said scale indicative of the presence of an unweighed load on said platform, cycling control switch means for said drive means operable in synchronism with said conveyor for energizing said drive means and operable to deenergize said drive means prior to the end of its cycle, second switch means connected in parallel with said cycling control switch means operated by said sensing means to energize said conveyor drive means and maintaining said conveyor drive means in said continuously running condition independently of said cycling control switch means, means for automatically initiating the operation of the computer system when said scale has come to balance with a weight thereon, and switch means driven by a cam operating in synchronism with said conveyor drive means for preventing the operation of said initiating means when said conveyor article handling means is in contact with an article on said weighing platform.

2. In a system for weighing and recording the weight of each of a plurality of successively weighed loads, the combination of a scale including a platform for receiving successive loads and a weighing mechanism adapted to be moved to a balance position corresponding to the weight of the load on said platform, means for recording the weight corresponding to each successive such balance position, read out means for transmitting data representing each such balance position from said weighing mechanism to said recording means, means responsive to the establishment of each such balance position for initiating the operation of said read out and recording means, said responsive means including means for detecting motion of said platform, said motion detecting means having a first condition blocking actuation of said responsive means during motion of said platform and a second condition actuating said rseponsive means in the absence of motion of said platform, a cyclically operable conveyor arranged to move a succession of loads in spaced relation onto and off of said platform, said conveyor having alternate feeding and nonfeeding operating stages with respect to the advancement of loads, control means having a first operating position blocking said responsive means from initiating operation of said read out and recording means irrespective of the condition of said motion detecting means and a second operating position releasing said responsive means to the control of said motion detecting means, and means operatively related with said conveyor to retain said control means in said first position thereof during each said feeding stage of said conveyor and to retain said control means in said second position thereof during each said nonfeeding stage of said conveyor in order to prevent the initiation of the operation of said read out and recording means while said conveyor is moving a load on said platform.

References Cited by the Examiner

UNITED STATES PATENTS

| | | | |
|---|---|---|---|
| 1,690,679 | 11/28 | Hebden | 177—12 |
| 2,697,580 | 12/54 | Howard | 177—3 |
| 2,709,076 | 5/55 | Hansen | 177—3 |
| 2,873,416 | 2/59 | Allen | 177—225 X |
| 3,085,640 | 4/63 | Allen | 177—3 |

LEO SMILOW, *Primary Examiner.*